(12) United States Patent
Price

(10) Patent No.: US 7,687,712 B2
(45) Date of Patent: Mar. 30, 2010

(54) MATCHING PATTERN FIXTURE COVERING SYSTEM AND METHOD

(76) Inventor: Sue Price, 8432 Cozy Cove Hollow, Blairsville, GA (US) 30512

( * ) Notice: Subject to any disclaimer, the term of this patent is extended or adjusted under 35 U.S.C. 154(b) by 186 days.

(21) Appl. No.: 11/635,742

(22) Filed: Dec. 7, 2006

(65) Prior Publication Data

US 2007/0148387 A1    Jun. 28, 2007

Related U.S. Application Data

(60) Provisional application No. 60/748,739, filed on Dec. 8, 2005.

(51) Int. Cl.
*H02G 3/14* (2006.01)
*H05K 5/03* (2006.01)
(52) U.S. Cl. ............... 174/66; 174/67; 220/241; 220/242; 33/563
(58) Field of Classification Search ............ 174/66, 174/67, 135; 220/241, 242, 3.8; 33/528, 33/563, DIG. 10, 526; 428/141, 142
See application file for complete search history.

(56) References Cited

U.S. PATENT DOCUMENTS

| | | | | |
|---|---|---|---|---|
| 2,980,283 A * | 4/1961 | Bentsen | ............... | 220/241 |
| 3,953,933 A * | 5/1976 | Goldstein | ............... | 174/66 |
| 4,353,759 A * | 10/1982 | Stallings | ............... | 174/66 |
| 5,321,206 A * | 6/1994 | Hibler | ............... | 174/66 |
| 5,491,902 A * | 2/1996 | Uhrin et al. | ............... | 33/528 |
| 5,675,125 A * | 10/1997 | Hollinger | ............... | 174/66 |
| 5,693,911 A * | 12/1997 | Sydow | ............... | 174/66 |
| 5,747,738 A * | 5/1998 | Indoe | ............... | 174/66 |
| 6,037,542 A * | 3/2000 | McCall | ............... | 174/66 |
| 7,259,329 B1 * | 8/2007 | Balma et al. | ............... | 174/66 |
| 7,344,433 B2 * | 3/2008 | Wilson | ............... | 174/66 |

* cited by examiner

*Primary Examiner*—Angel R Estrada
(74) *Attorney, Agent, or Firm*—Clifford Kraft

(57) ABSTRACT

A method and system of decoration that includes selecting a particular wall covering pattern, selecting a particular fixture, and continuing the wall covering pattern substantially over the surface of the fixture. The fixture can be an electrical fixture such as a receptacle and/or receptacle cover or switch and/or switch cover or any other type of plate or receptacle. The final arrangement is such that the pattern on the fixture or receptacle almost perfectly matches the wall pattern causing the fixture to become almost invisible.

9 Claims, 3 Drawing Sheets
(3 of 3 Drawing Sheet(s) Filed in Color)

MATCHING PATTERN FIXTURE COVERING SYSTEM AND METHOD

This application is related to and claims priority from U.S. provisional patent application No. 60/748,739 filed Dec. 8, 2005. Application No. 60/748,739 is hereby incorporated by reference.

BACKGROUND

1. Field of the Invention

The present invention relates to the field of wall fixture coverings and more particularly to a matching pattern fixture covering.

2. Description of the Prior Art

It is known in the art to cover walls with wallpaper, fabric or texture or to use marble with a visible pattern. When a wall is covered in this manner, there is a problem of how to choose or match wall fixtures such as switch and AC outlet covers with the pattern.

Prior art methods have simply used a plain plastic or metal plate. These plates make no attempt to match the pattern of the wall. Sometimes these plates are white or brown and sometimes they are brass or silver colored; other times they display some sort of non-matching, stock pattern.

It would be advantageous to have a covers that are designed to match a particular pattern perfectly to the point where they blend into the pattern and almost become invisible.

SUMMARY OF THE INVENTION

The present invention relates to a method of decoration that includes selecting a particular wall covering pattern, selecting a particular fixture, and continuing the wall covering pattern substantially over the surface of the fixture. The fixture can be an electrical fixture such as a receptacle and/or receptacle cover or switch and/or switch cover or any other type of plate or receptacle. The final arrangement is such that the pattern on the fixture or receptacle almost perfectly matches the wall pattern causing the fixture to become almost invisible.

DESCRIPTION OF THE FIGURES

The patent or application file contains at least one color photograph. Copies of the patent with colored photographs will be provided by the Patent and Trademark Office upon request and payment of the necessary fee.

Several drawings, photos or illustrations have been presented to better aid in the understanding of the present invention. The scope of the present invention is not limited to what is shown in the figures.

DESCRIPTION OF THE INVENTION

The present invention relates to a matching pattern fixture covering for any type of fixture including electrical switch and plug receptacles, plates and any other type of cover or fixture, electrical or non-electrical. A matching pattern is a surface decorative pattern that is substantially the same. It should be noted that while matching patterns are substantially the same, they can differ slightly in details, shade of color or brightness and in other respects.

The present invention causes the surface of the plate or cover to continue the wall design or texture pattern as closely as possible. Any method or means of printing, affixing or otherwise attaching or putting a pattern on a cover or plate or other surface is within the scope of the present invention. It is preferred to use lithographic techniques that actually print the pattern on the plate. The pattern on the final product should not only look as identical to the wall pattern as possible, but should also be solidly affixed so that washing, cleaning or normal wear and tear does not cause it to start to come off or be removed. This sort of durability can be achieved when the pattern is put on lithographically. The final pattern should be as durable as the pattern on the wall material if possible. Alternative methods of attaching the pattern can include bonding or gluing a paper containing the pattern to the plate.

Figure 1:
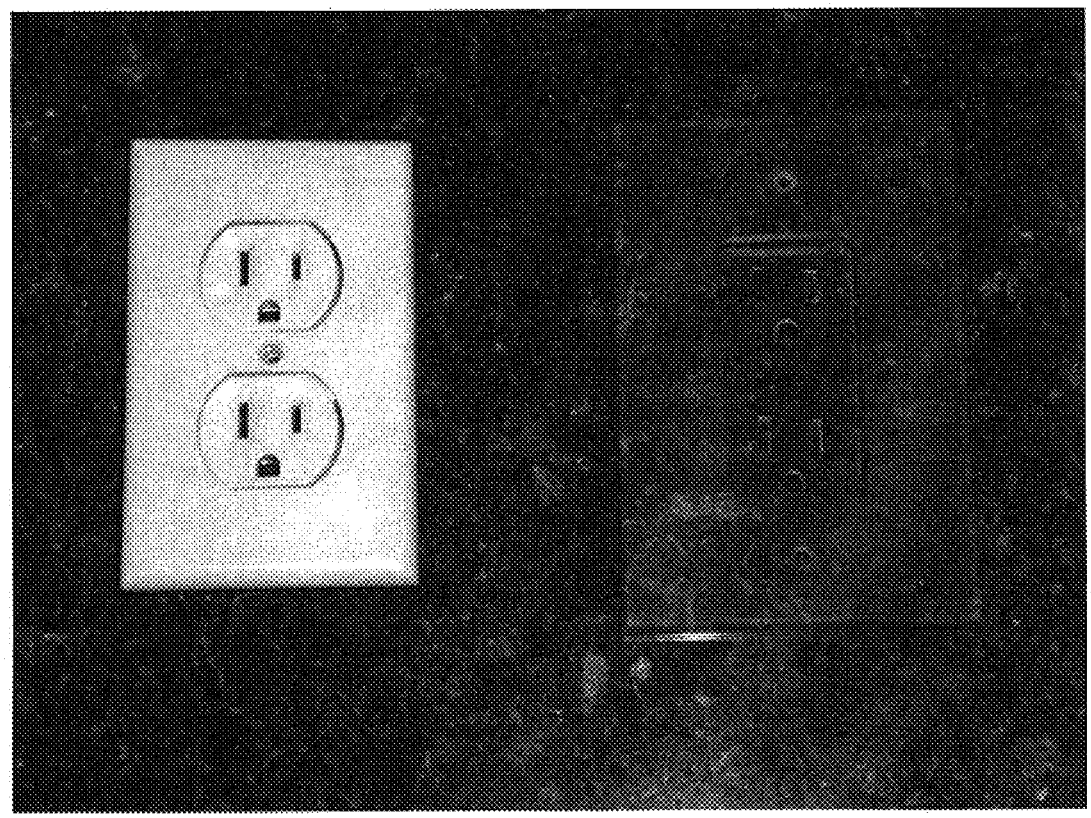
FIG. 1 is a color photograph that shows a comparison between a plain receptacle plate and one with a matched pattern.

Turning to FIG. 1, an example of a plain receptacle cover and an embodiment of the present invention are shown side-by-side. The striking difference between these two covers shows the merit of the present invention in enhancing the environment in a room. Rather than the stark white or brown cover, the cover of the present invention blends into the wall pattern very, very closely.

Figure 2:
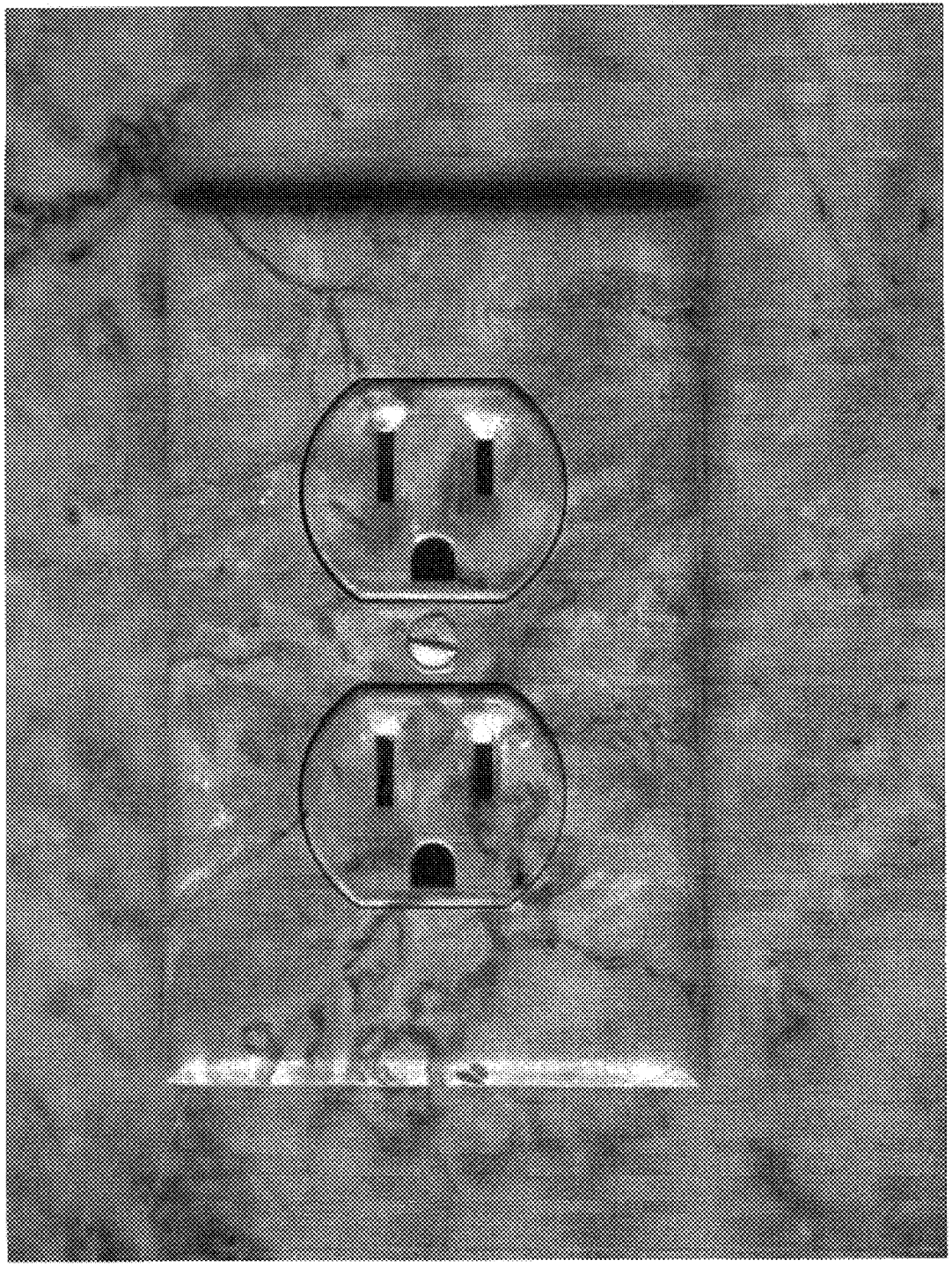
FIG. 2 is a color photograph that shows a different receptacle plate with a matched pattern.

FIG. 2 shows another embodiment of the present invention on a receptacle cover and on the receptacle itself so that the pattern is totally continuous.

Figure 3:
FIG. 3 is a color photograph that shows still another receptacle plate with a matched pattern.

FIG. 3 shows a third embodiment of the present invention showing an electrical switch cover with a continuous pattern that matches the wall pattern.

The matching patterns of the present invention continue and carry the pattern of the surrounding support member or surface such as a wall or wallboard, ceiling or other structural element.

Any method of carrying a wall pattern onto a fixture is within the scope of the present invention no matter how the pattern is affixed to the corresponding surface.

Several descriptions and illustrations have been provided to aid in understanding the present invention. One skilled in the art will realize that there are many changes, variations and modifications that can be made that do not depart from the spirit of the invention. All of these changes, variations and modifications are within the scope of the present invention.

I claim:

1. A method of decorating a wall comprising:
   selecting a particular wall covering pattern;
   selecting a wall fixture;
   placing a similar, but not necessarily identical, pattern on an outer surface of said fixture;
   placing said wall covering pattern on said wall with no attempt to match said wall covering pattern on said fixture;
   placing said fixture in place on said wall with no attempt to match said pattern on said outer surface of said fixture to said wall covering pattern on said wall.

2. The method of claim 1 wherein said fixture is an electrical fixture.

3. The method of claim 2 wherein said fixture is an electrical power receptacle cover.

4. The method of claim 2 wherein said fixture is an electrical switch cover.

5. The method of claim 1 wherein said wall covering pattern is a pattern on wallpaper.

6. An electrical fixture cover containing a surface decoration pattern similar to, but not necessarily identical with, a particular wall covering pattern, wherein edges of said pattern do not match an particular part of said wall covering pattern.

7. The electrical fixture cover of claim 6 wherein said wall covering pattern is a wallpaper pattern.

8. The electrical fixture cover of claim 6 wherein said surface decoration pattern is painted on said fixture cover.

9. The electrical fixture cover of claim 6 wherein said surface decoration pattern is affixed on said fixture cover.

* * * * *